(12) United States Patent
Asarikuniyil

(10) Patent No.: US 10,187,681 B2
(45) Date of Patent: Jan. 22, 2019

(54) ENHANCED STREAMING SOURCE CHANGE

(71) Applicant: THE DIRECTV GROUP, INC., El Segundo, CA (US)

(72) Inventor: Binny Asarikuniyil, Cerritos, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/366,122

(22) Filed: Dec. 1, 2016

(65) Prior Publication Data

US 2018/0160159 A1 Jun. 7, 2018

(51) Int. Cl.
| | |
|---|---|
| H04N 21/2662 | (2011.01) |
| H04L 29/06 | (2006.01) |
| H04L 29/08 | (2006.01) |
| H04N 21/44 | (2011.01) |
| H04N 21/262 | (2011.01) |
| H04N 21/2187 | (2011.01) |
| H04N 21/2387 | (2011.01) |
| H04N 21/472 | (2011.01) |
| H04N 21/462 | (2011.01) |

(52) U.S. Cl.
CPC ....... *H04N 21/2662* (2013.01); *H04L 65/105* (2013.01); *H04L 65/4092* (2013.01); *H04L 67/10* (2013.01); *H04N 21/2187* (2013.01); *H04N 21/2387* (2013.01); *H04N 21/26258* (2013.01); *H04N 21/44004* (2013.01); *H04N 21/4621* (2013.01); *H04N 21/47217* (2013.01)

(58) Field of Classification Search
CPC combination set(s) only.
See application file for complete search history.

(56) References Cited

U.S. PATENT DOCUMENTS

| | | |
|---|---|---|
| 7,949,775 B2 | 5/2011 | Virdi et al. |
| 8,368,631 B2 | 2/2013 | Nilsson et al. |
| 8,769,141 B2 | 7/2014 | Melnyk et al. |
| (Continued) | | |

OTHER PUBLICATIONS

Juluri, Parikshit, Venkatesh Tamarapalli, and Deep Medhi, "SARA: Segment Aware Rate Adaption Algorithm for Dynamic Adaptive Streaming over HTTP," 2015 IEEE International Conference on Communication Workshop (ICCW), IEEE, 2015.

(Continued)

*Primary Examiner* — Hunter B Lonsberry
(74) *Attorney, Agent, or Firm* — Baker & Hostetler LLP

(57) ABSTRACT

A technique for managing transitions between streaming media sources can include receiving a request from a client to change a streaming media source from an initial streaming media source to a next streaming media source. The initial streaming media source includes last segments being streamed to the client and the next streaming media source is selected by the client from a virtual master playlist. The technique further includes identifying the next streaming media source in a master playlist of a content delivery network, inserting a discontinuity between last segments of the initial streaming media source and first segments of the next streaming media source, and streaming the first segments of the next streaming media source to the client as a continuous stream from the last segments of the initial streaming media source with the discontinuity between the last segments and the first segments.

10 Claims, 6 Drawing Sheets

(56) References Cited

U.S. PATENT DOCUMENTS

| | | |
|---|---|---|
| 8,918,636 B2 | 12/2014 | Kiefer |
| 9,015,470 B2 | 4/2015 | Losev et al. |
| 9,020,039 B2 | 4/2015 | van der Schaar |
| 9,357,210 B2 | 5/2016 | Orton-Jay et al. |
| 9,386,067 B2 | 7/2016 | Bulava et al. |
| 2004/0034864 A1* | 2/2004 | Barrett ............ H04N 21/23406 725/38 |
| 2012/0011269 A1* | 1/2012 | Krikorian ......... H04L 29/06027 709/231 |
| 2015/0201012 A1 | 7/2015 | Shaffer |
| 2015/0296205 A1 | 10/2015 | van der Schaar |
| 2015/0326632 A1 | 11/2015 | Lammers et al. |
| 2015/0365450 A1* | 12/2015 | Gaunt ................. H04L 65/4084 709/231 |
| 2016/0173915 A1 | 6/2016 | McCarthy et al. |

OTHER PUBLICATIONS

Huang, Te-Yuan, et al., "A Buffer-Based Approach to Rate Adaption: Evidence From a Large Video Streaming Service," ACM SIGCOMM Computer Communication Review 44.4 (2015): 187-198.

\* cited by examiner

ENHANCED STREAMING SOURCE CHANGE

FIELD OF INVENTION

This disclosure generally relates to streaming media using networks, and more particularly to improving switching between sources in adaptive bitrate streaming architectures.

BACKGROUND

Adaptive bitrate (ABR) streaming is a technique whereby, for each particular title or clip of streaming media, multiple bitrates (which correspond to quality measures such as video resolution or sound quality) are available from the content delivery network. As higher bitrates require more bandwidth—the rate of bit transfer is greater to carry higher quality streaming content—ABR enables participants in a content streaming arrangement to select bitrates which balance quality and participant capabilities by allowing quality to increase where resources (e.g. bandwidth, processor time, memory) can do so without interruptions (e.g., lag, buffering) or decrease to reduce or eliminate interruptions.

In typical ABR arrangements, ABR sources can be switched. For example, viewing a streaming library, a user may open a menu to select different content to view. Scheduling may automate switching, such as where live broadcasts are streamed or based on parental controls. This switching may involve pausing the stream to access a menu or continuing playback during selection. However, once a next ABR source is identified for streaming (switching from the initial ABR source), the system re-initializes its resources, playlists, and relationships within the streaming network prior to streaming the segments. This results in substantial delay before playback begins with content from the next ABR source.

SUMMARY

In an embodiment, a method includes receiving a request from a client to change a streaming media source from an initial streaming media source to a next streaming media source. The initial streaming media source includes last segments being streamed to the client, and the next streaming media source is selected by the client from a virtual master playlist. The method further includes identifying the next streaming media source in a master playlist of a content delivery network, wherein the virtual master playlist includes a mapping of the master playlist. The method further includes inserting a discontinuity between last segments of the initial streaming media source and first segments of the next streaming media source, as well as streaming the first segments of the next streaming media source to the client as a continuous stream from the last segments of the initial streaming media source with the discontinuity between the last segments and the first segments.

In an embodiment, a system includes a media proxy run by a processor and stored on a non-transitory computer readable medium. The media proxy includes a pre-initialization module that initializes available streaming media sources in a master playlist from a content delivery network, a playlist module that creates a virtual master playlist by mapping the master playlist based on the initialized streaming media sources, a client interface module that provides the virtual master playlist to a client and receives video selections from the client, and a fetch module that fetches streaming media segments from the content delivery network.

In an embodiment, a system includes a client including a processor and instructions stored on a non-transitory computer readable medium. The instructions when executed perform a method including receiving a virtual master playlist from a media proxy, the media proxy is an intermediary between the client and a content delivery network and requesting to change to a next adaptive bitrate streaming (ABR) source from an initial ABR source. The initial ABR source includes last segments being streamed to the client and the next ABR source is selected by the client from the virtual master playlist. The instructions and method further include clearing at least a portion of a buffer associated with the client, wherein the buffer receives the last segments, and buffering the first segments of the next ABR source as a continuous stream from the last segments of the initial ABR source with a discontinuity between the last segments and the first segments.

In embodiments, non-transitory computer readable media can store instructions for performing or causing aspects disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Aspects of the herein described systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Aspects herein concern providing enhanced ABR source switching to avoid delay before playback. Aspects herein avoid re-initialization in ABR environments, thereby reducing switching time, by utilizing virtual playlists generated from mappings of content delivery network (CDN) master playlists (and, in embodiments, media playlists providing a manifest of segments available for particular media of a master playlist) which enable buffering of segments from a next or subsequent ABR source after segments from an initial ABR source without re-initializing in the same manner as was performed setting up the initial ABR source. Virtual playlists can encapsulate all media playlists associated with the master playlist so that no re-initialization is required on source change. By leveraging distributed resources to generate virtual playlists, "all" possible ABR sources are accordingly initialized at (or prior to) client setup. An intentional discontinuity can be provided between the two sources either for aesthetics (e.g., clean break for client/user) or functional reasons (e.g., discard any retained portions of buffer not associated with the next/subsequent ABR source).

While aspects herein are described in terms of ABR implementation, any appropriate streaming media or other streaming data techniques utilizing similar aspects can utilize the technology without departing from the scope or spirit of the innovation.

As used herein, "enhanced ABR source switching" refers to changing media streamed according to ABR techniques in a manner which reduces processing burden and avoids periods without streaming media between an initial ABR source and a next ABR source. An ABR source is a particular portion of media, such as a title or clip, being streamed in segments. The initial ABR source is thus a first ABR source, the first media streamed to a player, while a next ABR source identifies media based on a manual or automatic selection to change the media from the initial ABR source to something else. A subsequent ABR source can be a next ABR source or an ABR source selected after a next ABR source.

Initial, next, and subsequent ABR sources can be streamed, scheduled, displayed, et cetera, as a continuous stream. A continuous stream, as used herein, is one which does not include an unintentional pause, absence of content, or loading screen between an initial, next, and/or subsequent stream. In embodiments, a continuous stream avoids emptying the client or player buffer between an initial, next, and/or subsequent stream by buffering the next (or subsequent) segments behind those currently playing. A continuous stream may still have an intentionally-provided discontinuity between an initial ABR source and a next ABR source (or a next ABR source and a subsequent ABR source) to differentiate the two streams, but does not experience "downtime" due to re-initialization in the same manner as conventional ABR streams which are discontinuous on changing sources.

Figure 1:
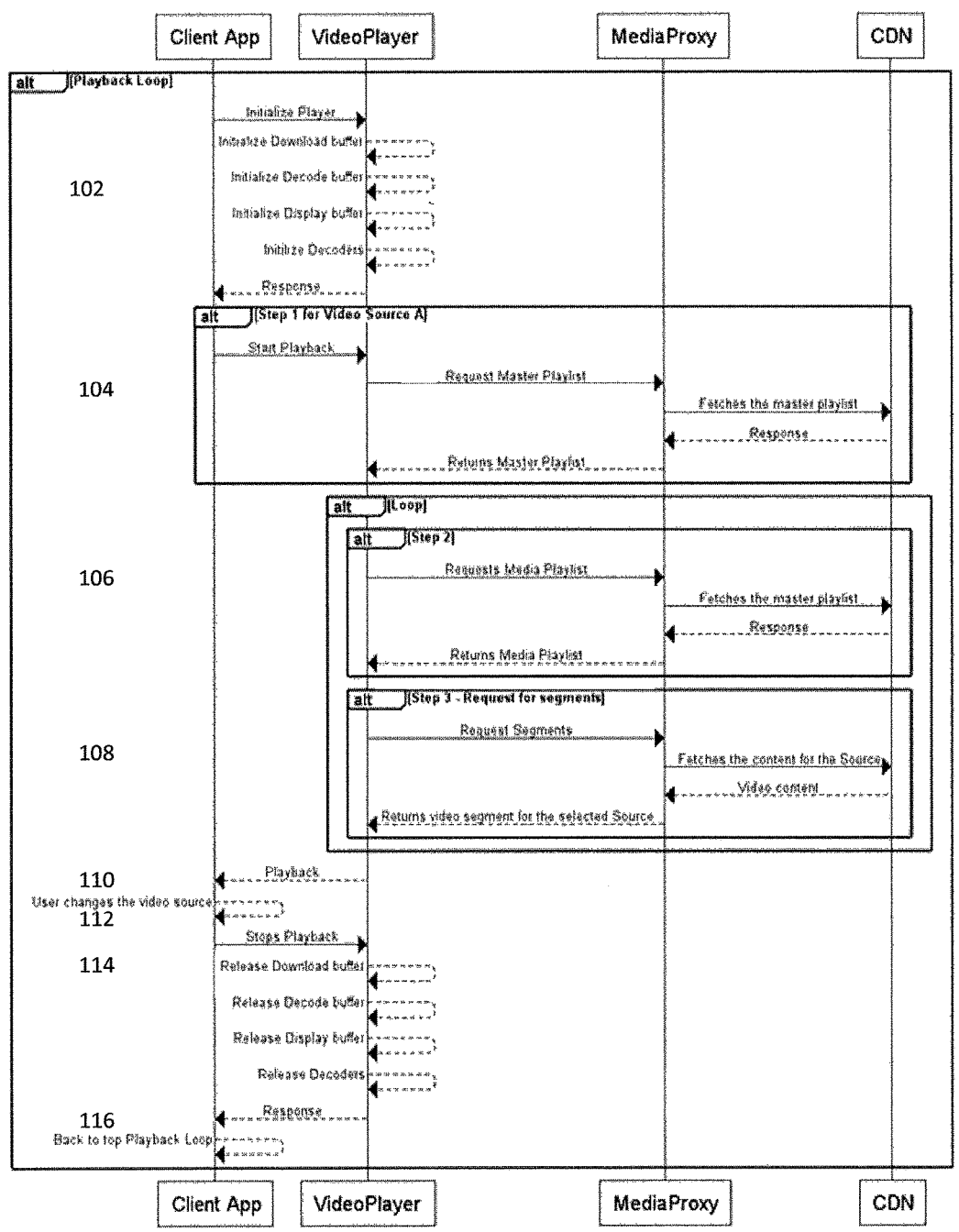
FIG. 1 illustrates an example technique for streaming ABR video and switching ABR sources.

As shown in FIG. 1, a technique for providing ABR segments includes a client communicating with a ABR manager in communication with a CDN. Methodology 100 begins at 102 where initialization steps are performed by the client. These can include initializing the player, initializing a download buffer, initializing a decode buffer, initializing a display buffer, and initializing decoders. With initialization complete, the player can acknowledge it is prepared to begin playback from a first ABR source.

At 104, to begin playback, a master playlist can be sourced from the CDN. In an embodiment, a ABR manager can fetch the master playlist, reflecting the ABR streams available at the CDN, from the CDN, and return it to the client to allow the client to make selections from the playlist. In an alternative embodiment of FIG. 1, the ABR manager can be omitted, and the client can communicate directly with the CDN, receiving the master playlist directly from the CDN.

In embodiments utilizing a ABR manager, a media playlist can be provided that interprets the master playlist from the CDN to a translated playlist usable by the client, including some or all of the content available via the CDN. In an embodiment, the ABR manager may control the bitrate provided to the client from the CDN in ABR, and the media playlist only reflects one playlist entry per title (e.g., details about the selected bitrate variant with selected options, segment duration(s), encryption (if any)), while the master playlist includes information regarding all segments in all available bitrates for all titles. The master playlist can also include audio options, closed captioning options, and other options. In such embodiments, at 106, a media playlist can be provided to the client via the ABR manager.

Based on the video sought by the client, at 108, segments corresponding to the requested title can be fetched from the CDN via the ABR manager, or directly from the CDN in embodiments where the client interacts with the CDN without use of a proxy. At 110, playback proceeds, and segments are streamed.

At 112, the user can change the source of the ABR streaming video by providing a new selection from a playlist. In the embodiment(s) illustrated, methodology 100 completes several reset steps and begins anew. Specifically, at 114, playback is stopped and various resources are released. In embodiments, these resources can include the download buffer, the decode buffer, the display buffer, and decoders. Once the client releases these resources for new utilization, at 116 methodology 100 recycles to 102 where the new stream is initialized to provide ABR video to the client.

The period after playback stops—releasing buffers and resources at 114, recycling at 116, and re-initializing the player, playlists, and streams at 102 and thereafter—results in a gap between the initial ABR video source and the next ABR video source. This pause can be significant, wasting viewer time and disrupting viewing experience.

Figure 2:
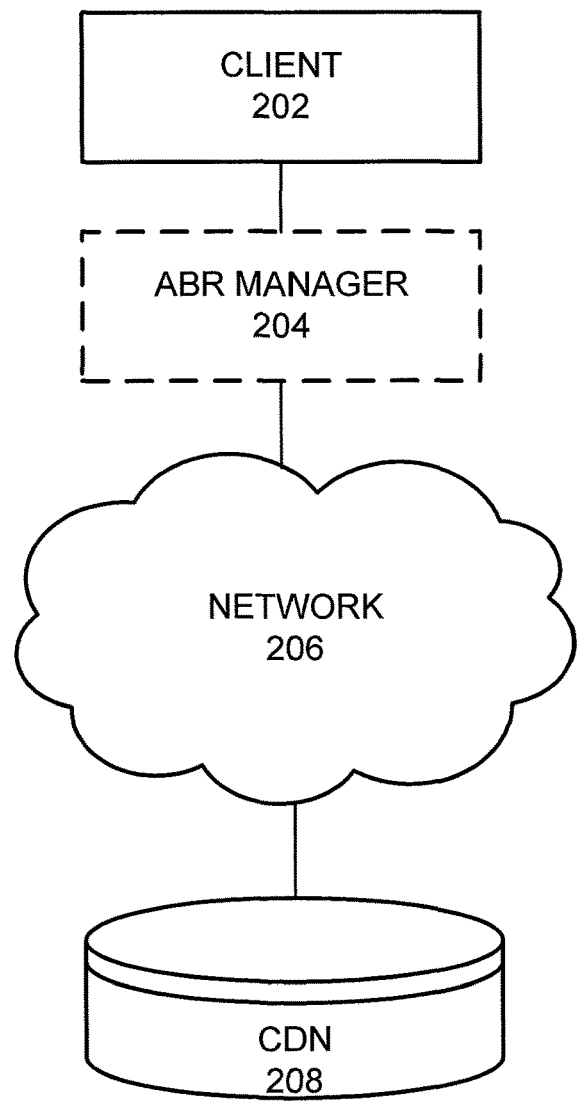
FIG. 2 illustrates a block diagram of an example system for implementing aspects of FIG. 1.

A block diagram showing a system 200 capable of implementing methodology 100 is shown in FIG. 2. FIG. 2 includes client 202, ABR manager 204, network 206, and CDN 208. Client 202 can include the hardware and/or software utilized by a user to stream ABR video. ABR manager 204 can be integrated in the client, in network 206, or elsewhere. Network 206 provides connectivity to CDN 208, which stores and serves the various titles at the appropriate bitrates to allow ABR video streaming.

Figure 3A:
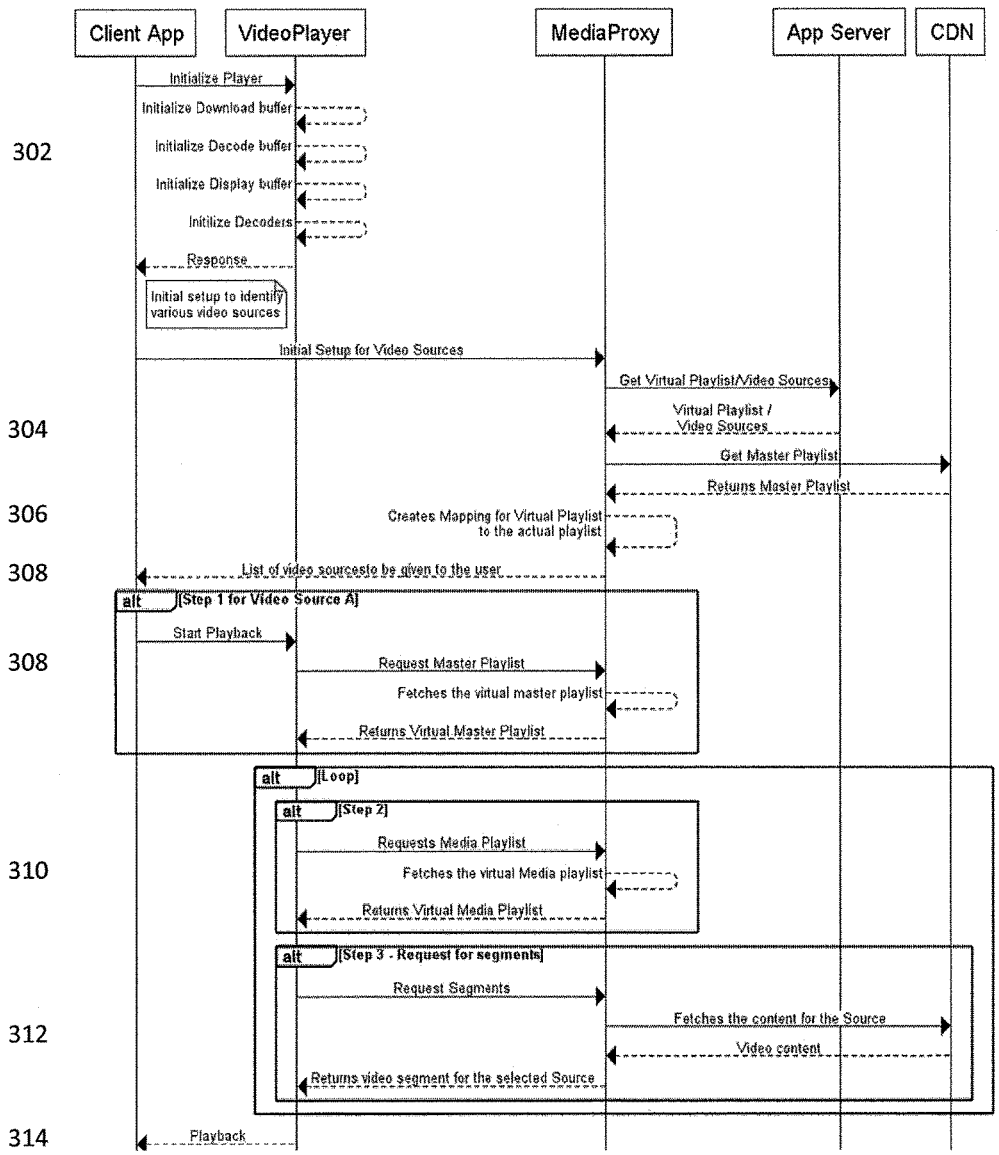
FIGS. 3A and 3B illustrate an example technique for streaming ABR video using enhanced ABR source switching.
Figure 3B:
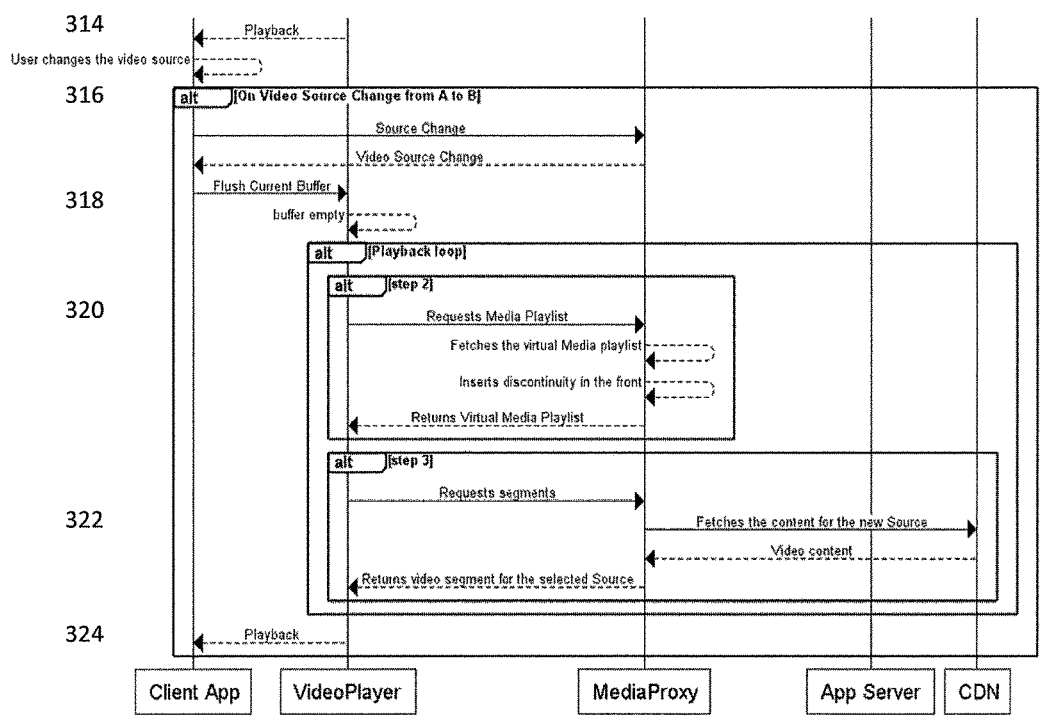

To eliminate the disruptive break in playback during ABR streaming, FIGS. 3A and 3B illustrate methodology 300 which avoids the break in streaming media after a change from an initial ABR source before the next ABR source segments are in playback. Starting with FIG. 3A, methodology 300 begins at 302 with initialization steps, to include initializing a player, download buffer, decode buffer, display buffer, and decoders.

Thereafter, at 304, ABR source setup is completed whereby a media proxy communicates with a video application server to collect sources to build a virtual master playlist for all possible media available to client. A master playlist is fetched from a CDN, and a mapping created to generate a virtual master playlist usable by the client. The virtual master playlist is similar to the master playlist fetched from the CDN, but does not include details about specific video source information, as this is not provided to the client.

At 308, the virtual master playlist (or a compatible playlist generated therefrom) is provided to the client to allow the client to select an initial ABR source to draw playback. The initial ABR source is a particular title or media clip, which the user selects, but the actual segments streamed will depend on management of the ABR streaming process which is dependent on client and architecture constraints.

Based on the selection, at 308, the media proxy and video player interact to begin playback by fetching and returning the master playlist, which can provide a list of media titles or clips available. Thereafter, at 310, a virtual media playlist associated with a specific title or clip is fetched to direct the system(s) involved to the appropriate segments for that media selected from the master playlist. The virtual media playlist returned at 310 differs from a "standard" media playlist but excludes source details. In an embodiment, the virtual media playlist can include not only the selected media information, but information regarding other available media to allow other content to be treated as the same stream for improved switching in a future selection.

With the virtual media playlist returned, at 312 the appropriate ABR segments are requested for the initial ABR source (e.g., selected media), and playback can begin once the segments are fetched, buffered, decoded, and displayed. Playback occurs and continues through 314.

Turning to FIG. 3B, playback is ongoing at 314. However, at 316, the user changes the source, selecting a next ABR source associated with different media. At 318, a current buffer can be at least partially flushed. In embodiments, buffers are not completely flushed, or may be allowed to "run out" based on timing associated with queueing the next ABR source. In this regard, download speeds, available bitrates, and other statistical information or analytics associated with the client, CDN, and intervening elements can be assessed to determine the number of seconds until the next ABR source is streaming in playback, with buffer flushing occurring only for portions of the buffer at or beyond that time (e.g., 2 seconds, 3 seconds, 10 seconds, or any other amount of time).

At 320, a media playlist is requested from the media proxy to discover the segments available for the next ABR source requested by the client. Unlike the technique employed in methodology 100, the new selection is made from the virtual master playlist (or a device or application compatible playlist generated therefrom), rather than the master playlist. Because the virtual master playlist compiles and maps all available media from the master playlist at initialization (or in an ongoing fashion during playback), no additional initialization or fetching of the master playlist is required, avoiding one type of switching delay.

Thereafter at 322, ABR segments from the next ABR source are requested and returned. In embodiments, a discontinuity is inserted between the last segments of the initial ABR source and the first segment of the next ABR source, which can provide a visual indicator of the switch or otherwise create an aesthetic or functional transition between the two streams to avoid user confusion or for other purposes. At 324, playback of the next ABR source begins and persists until viewing ends (e.g., end of the program, automatic or manual termination by client, et cetera) or until a subsequent ABR source is selected, which recycles methodology 300 to 314/316 as if the next ABR source were the initial ABR source.

Figure 4:
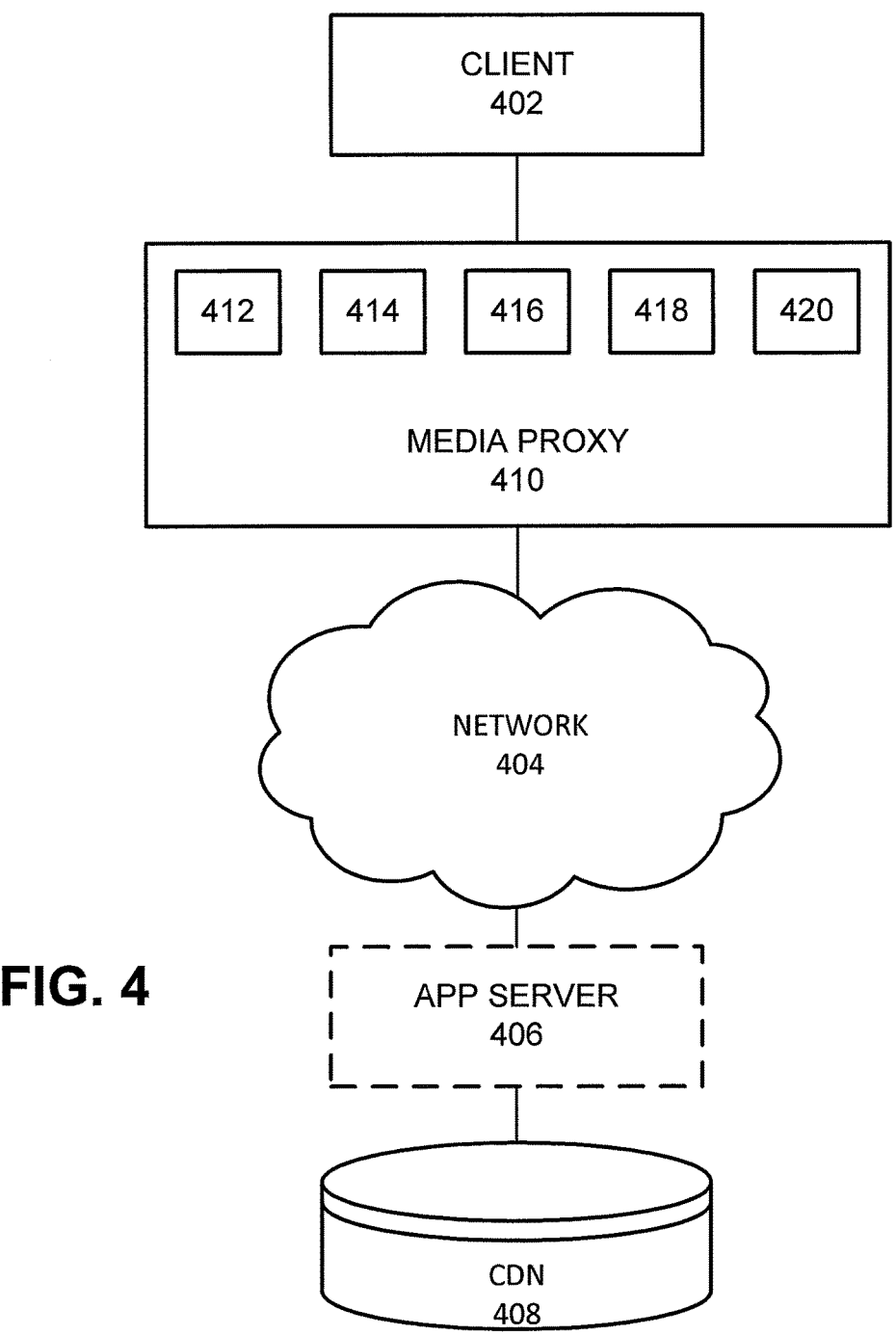
FIG. 4 illustrates a block diagram of an example system for implementing aspects of FIG. 3.

FIG. 4 illustrates an example block diagram of a system 400 for carrying out aspects of methodology 300. System 400 includes client 402, media proxy 410, network 404, CDN 408, and, in embodiments, video application server 406. While illustrated as separate components, other arrangements can be employed without departing from the scope or spirit of the innovation. For example, media proxy 410 may be a subcomponent of client 402, within network 404, and/or include or be a subcomponent of application server 406. Likewise, video application server 406 may be a subcomponent of client 402, media proxy 410, or CDN 408, may be within network 404, and/or may include media proxy 410 or other elements.

Client 402 requests and receives streaming content, and may play streaming content for a user or pass the streaming content to a player. It communicates with other elements through network 404, in the arrangement shown or alternatives to what is illustrated (e.g., connects to media proxy 410 through Internet rather than directly). Application server 406 can be a server associated with a media player, or hardware or software of client 402, which communicates with CDN 408. In embodiments, application server 406 acts as an intermediary or manages playlists for CDN 408 which stores media content but does not direct the media content to client 402, or which may not allow client 402 or entities outside of CDN 408 owners' control to directly access.

Media proxy 410 enables enhanced changing of ABR sources and handles playlists and communication for client 402. Media proxy 410 can include a variety of modules in various embodiments.

In an embodiment, media proxy 410 includes pre-initialization module 412. The pre-initialization module 412 can process a master playlist and/or any media playlists or manifests available for two or more (and in some embodiments, all available) media from CDN 408 and/or video application server 406. Pre-initialization module can also ensure all initialization steps in client 402 and/or other components are complete to begin streaming from an initial ABR source (e.g., the initial set-up process for ABR streaming).

In an embodiment, media proxy 410 includes playlist module 414. Playlist module 414 can generate a virtual master playlist by mapping the master playlist to a virtual master playlist based on the initialized ABR sources. The playlist module 414 can also generate a virtual media playlist. The virtual master playlist and/or virtual media playlist can include playlist information for segments from multiple titles and/or clips, in contrast with a standard media playlist which only describes segment information at different bitrates (or based on other quality metrics, such as performance among different CDN mirrors) for one title and/or clip. The virtual master playlist and/or virtual media playlist generated by playlist module 414 allows for a segment of a different, next ABR source to be buffered immediately behind a currently-playing initial ABR source to avoid disruption of streaming video—for example, "downtime" spent with blank screens or loading notifications—without starting the process anew by re-initializing the entire process.

In an embodiment, media proxy 410 includes client interface module 416. Client interface module 416 provides the virtual master playlist and/or virtual media playlist to the client. Client interface module 416 can also handle other interactions with the client (and/or application server 406), such as receiving selections related to particular media for streaming.

In an embodiment, media proxy 410 includes fetch module 418. The fetch module 418, alone or in conjunction with application server 406 or other components, can fetch the appropriate ABR video segments from CDN 408 based on the selection and the ABR techniques in place, thereby providing the appropriate bitrate segments for the intended media.

In an embodiment, media proxy 410 includes media proxy video buffer module 420. Media proxy video buffer module can receive data from CDN 408 for provisioning to client 402 and buffer the data between CDN 408 and client 402. In embodiments, a buffer module may exist in or under control of media proxy 410, but in alternative embodiments alternative or complementary intermediary buffers can be employed (e.g., application server 406, elsewhere in network 404, and so forth).

While FIGS. 1-4 are provided to discuss the enhanced or enhanced switching technique between ABR streams, subsets of these illustrations can be utilized without departing from the scope or spirit of the innovation. The disclosures herein relate to a variety of different components, systems, elements, methodologies, and techniques, all of which are embraced within the scope or spirit of the innovation. Such aspects, which are not illustrated independently, include: a client configured to perform enhanced ABR source switching; executable instructions for performing enhanced ABR source switching at a client; a method for performing enhanced ABR source switching at a media proxy; executable instructions for performing enhanced ABR source switching using a media proxy; a method for performing enhanced ABR source switching using a media proxy; systems and methods for creating virtual playlists for enhanced ABR source switching; systems and methods for switching ABR sources without re-initialization or duplicating/repeating all aspects required for initial ABR source setup; an application server configured to provide virtual playlists or other information for enhanced ABR source switching; executable instructions for performing enhanced ABR source switching at an app server; a method for performing enhanced ABR source switching at an app server; a content delivery network configured to facilitate enhanced ABR source switching; a content delivery network providing virtual playlists for enhanced ABR source switching; executable instructions for performing enhanced ABR source switching with a CDN; a method for performing enhanced ABR source switching at a CDN; and so forth. Aspects related to virtual playlist generation and enhanced ABR source switching can be embodied in a variety of subcomponents (e.g., media players), distributed among multiple elements (e.g., performed by network hardware or software), and so forth.

Figure 5:
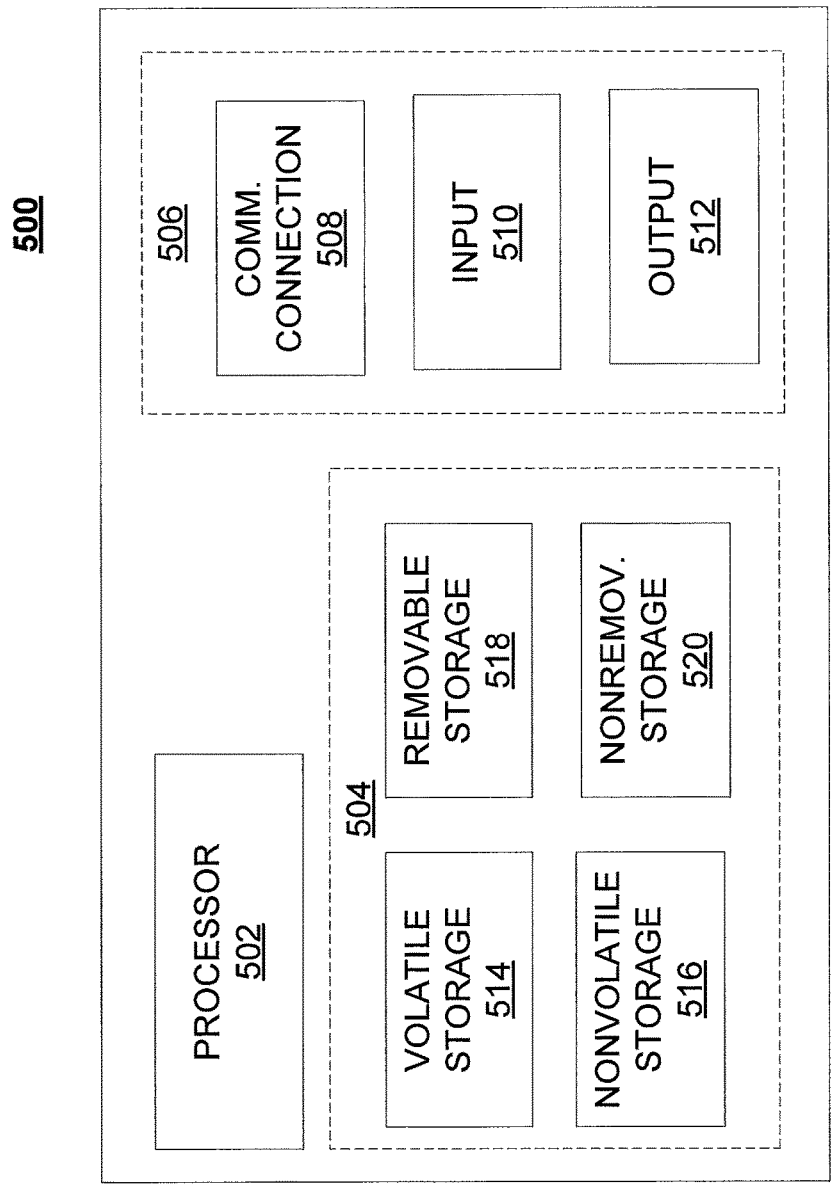
FIG. 5 is a schematic of an exemplary network device.

FIG. 5 is a block diagram of network device 500 that may be connected to or comprise a component or components shown in FIGS. 2 and 4. Network device 500 may comprise hardware or a combination of hardware and software. The functionality to facilitate telecommunications via a telecommunications network may reside in one or combination of network devices 500. Network device 500 depicted in FIG. 5 may represent or perform functionality of an appropriate network device 500, or combination of network devices 500, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 500 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 500 may comprise a processor 502 and a memory 504 coupled to processor 502. Memory 504 may contain executable instructions that, when executed by processor 502, cause processor 502 to effectuate operations associated with mapping wireless signal strength. As evident from the description herein, network device 500 is not to be construed as software per se.

In addition to processor 502 and memory 504, network device 500 may include an input/output system 506. Processor 502, memory 504, and input/output system 506 may be coupled together to allow communications therebetween. Each portion of network device 500 may comprise circuitry for performing functions associated with each respective portion. Thus, each portion may comprise hardware, or a combination of hardware and software. Accordingly, each portion of network device 500 is not to be construed as software per se. Input/output system 506 may be capable of receiving or providing information from or to a communications device or other network entities configured for telecommunications. For example input/output system 506 may include a wireless communications (e.g., 3G/4G/GPS) card. Input/output system 506 may be capable of receiving or sending video information, audio information, control information, image information, data, or any combination thereof. Input/output system 506 may be capable of transferring information with network device 500. In various configurations, input/output system 506 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 506 may comprise a Wi-Fi finder, a two-way GPS chipset or equivalent, or the like, or a combination thereof.

Input/output system 506 of network device 500 also may contain a communication connection 508 that allows network device 500 to communicate with other devices, network entities, or the like. Communication connection 508 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with telecommunications, such as functions for processing broadcast messages, as described herein. For example, processor 502 may be capable of, in conjunction with any other portion of network device 500, determining a type of broadcast message and acting according to the broadcast message type or content, as described herein.

Memory 504 of network device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with telecommunications. Depending upon the exact configuration or type of processor, memory 504 may include a volatile storage 514 (such as some types of RAM), a nonvolatile storage 516 (such as ROM, flash memory), or a combination thereof. Memory 504 may include additional storage (e.g., a removable storage 518 or a nonremovable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 500. Memory 504 may comprise executable instructions that, when executed by processor 502, cause processor 502 to effectuate operations to map signal strengths in an area of interest.

While ABR is typically implemented using HTTP live streaming (HLS), it will be appreciated that components and techniques described herein can be utilized in other environments without departing from the scope or spirit of the disclosure, and are not limited by HLS.

More, while aspects herein are generally directed to adaptive bitrate streaming video, it is understood that the techniques described herein can be utilized in any environment where multiple content sources can be streamed, and particularly where data is stream-able at varying qualities, rates, or in differing versions which are toggled seamlessly from a user perspective. While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with ABR streaming systems and methods as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing content delivery as described herein. When implemented on a general-purpose processor, the program code combines with the processor to provide a unique device that operates to invoke the functionality of a streaming system.

While ABR streaming systems and methods have been described in connection with the various examples of the various figures, it is to be understood that other similar implementations may be used or modifications and additions may be made to the described examples of a streaming system or method without deviating therefrom. For example, one skilled in the art will recognize that a streaming system as described in the instant application may apply to any environment, whether wired or wireless, and may be applied to any number of such devices connected via a communications network and interacting across the network. Therefore, streaming systems and methods as described herein should not be limited to any single example, but rather should be construed in breadth and scope in accordance with the appended claims.

What is claimed is:

1. A method, comprising:
retrieving a master playlist from a content delivery network using a media proxy;
generating a virtual master playlist at the media proxy by mapping the master playlist to the virtual master playlist, wherein the virtual master playlist includes all media associated with the master playlist, and wherein the virtual master playlist excludes media source information from the master playlist;
providing the virtual master playlist to a client, the client handles the virtual master playlist as the master playlist, wherein the media proxy is remote to the client;
receiving a request from the client to change a streaming media source from an initial streaming media source to a next streaming media source, the initial streaming media source including last segments being streamed to the client, the next streaming media source selected by the client from the virtual master playlist;
identifying the next streaming media source in the master playlist of the content delivery network, the virtual master playlist including a mapping of the master playlist;
inserting a discontinuity between last segments of the initial streaming media source and first segments of the next streaming media source; and
streaming the first segments of the next streaming media source to the client as a continuous stream from the last segments of the initial streaming media source with the discontinuity between the last segments and the first segments, wherein the discontinuity provides an aesthetic transition between the last segments and the first segments.

2. The method of claim 1, further comprising scheduling the initial streaming media source and the next streaming media source as a continuous stream.

3. The method of claim 2, further comprising scheduling one or more subsequent streaming media sources as a continuous stream.

4. The method of claim 1, further comprising causing clearing of at least a portion of a buffer associated with the client and containing one or more segments from the initial streaming media source.

5. The method of claim 4, further comprising causing buffering of the first segments to at least the portion of the buffer associated with the client after the last segments.

6. A system, including:
   a client including a processor and instructions stored on a non-transitory computer readable medium, the instructions when executed perform a method including:
   receiving a virtual master playlist from a media proxy, wherein the media proxy is an intermediary between the client and a content delivery network, wherein the virtual master playlist is generated at the media proxy by mapping a master playlist to the virtual master playlist, wherein the virtual master playlist includes all media associated with the master playlist, wherein the virtual master playlist excludes media source information from the master playlist, wherein the client handles the virtual master playlist as the master playlist, and wherein the media proxy is remote to the client;
   requesting to change to a next adaptive bitrate streaming (ABR) source from an initial ABR source, the initial ABR source including last segments being streamed to the client, the next ABR source selected by the client from the virtual master playlist;
   clearing at least a portion of a buffer associated with the client, the buffer receiving the last segments; and
   buffering first segments of the next ABR source as a continuous stream from the last segments of the initial ABR source with a discontinuity between the last segments and the first segments,
   wherein the media proxy is defined by instructions stored on a non-transitory computer readable medium run by a system remote to the client, and
   wherein the content delivery network is operatively coupled with storage maintaining the last segments and the first segments.

7. The system of claim 6, the instructions further including playing video from the initial ABR source using the client.

8. The system of claim 7, the instructions further including playing video from the next ABR source using the client without a break in playback from the initial ABR source.

9. The system of claim 6, the client is one of a television, a content box, a media server, or a smart device.

10. The method of claim 4, wherein the discontinuity is used for causing the clearing of at least the portion of the buffer associated with the client and containing one or more segments from the initial streaming media source.

* * * * *